J. M. CLARK.
TIRE.
APPLICATION FILED FEB. 20, 1915. RENEWED MAR. 10, 1916.
1,185,481.
Patented May 30, 1916.
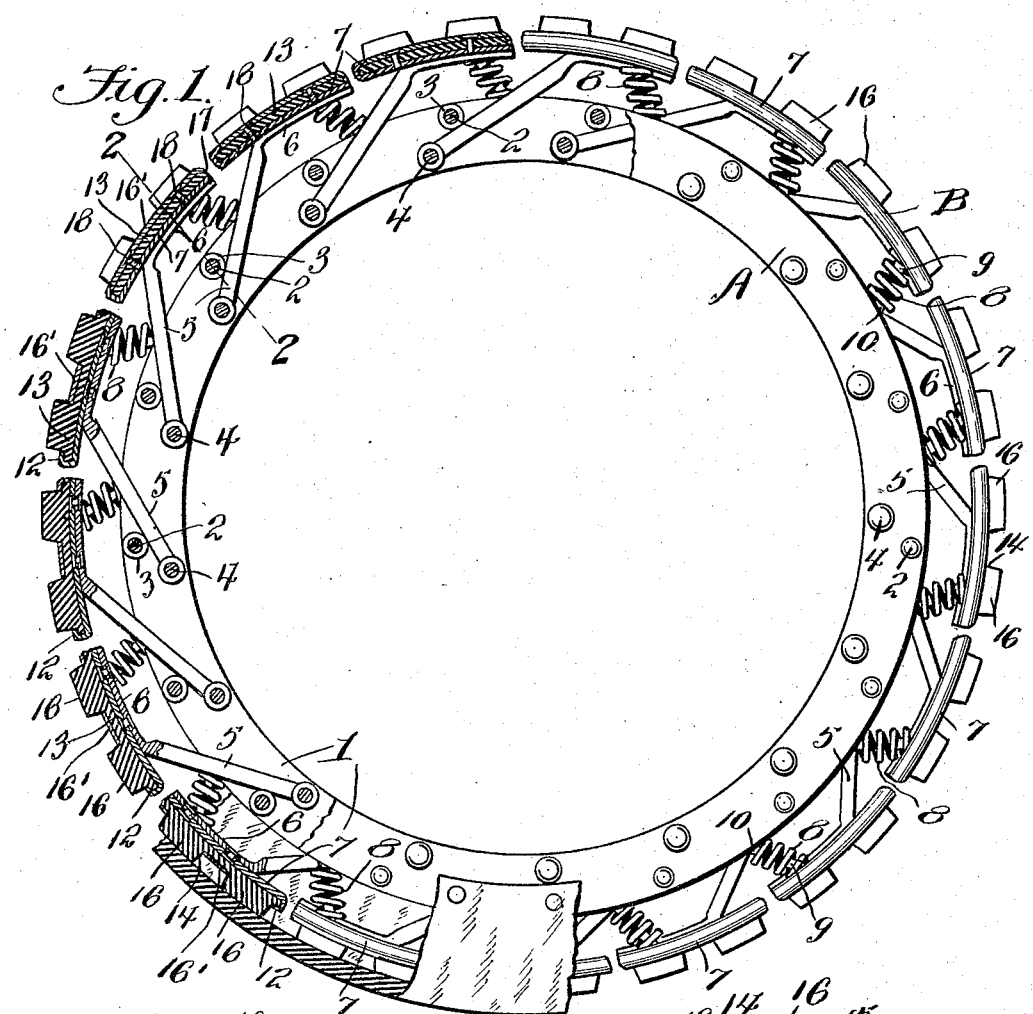
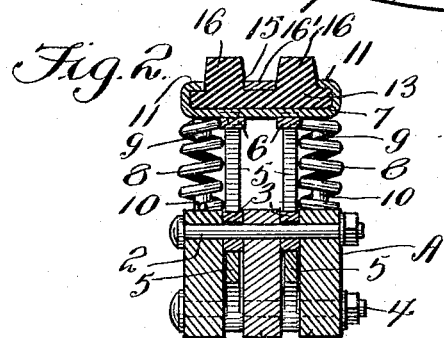
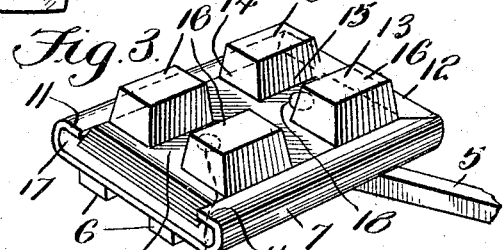
Inventor
J. M. Clark
By Victor J. Evans
Attorney
Witnesses s# UNITED STATES PATENT OFFICE.

JOSEPH M. CLARK, OF HANFORD, WASHINGTON.

TIRE.

1,185,481. Specification of Letters Patent. Patented May 30, 1916.

Application filed February 20, 1915, Serial No. 9,698. Renewed March 10, 1916. Serial No. 83,412.

*To all whom it may concern:*

Be it known that I, JOSEPH M. CLARK, a citizen of the United States, residing at Hanford, in the county of Benton and State of Washington, have invented new and useful Improvements in Tires, of which the following is a specification.

This invention relates to vehicle wheel tires, the object in view being to provide a tire of novel construction applicable to any vehicle wheel and which embodies means for obtaining the requisite amount of resiliency of the tread without the use of the ordinary pneumatic tube or air cushion, thereby doing away with the more prevalent tire troubles such as punctures, blow outs and the like.

With the above and other objects in view, the invention consists in the novel construction, combination and arrangement of parts, as herein described, illustrated and claimed.

In the accompanying drawings: Figure 1 is a side elevation partly in section of a portion of a tire embodying the present invention. Fig. 2 is a cross section through the same on the line 2—2 of Fig. 1. Fig. 3 is a detail perspective view of one of the tread sections.

The tire contemplated in this invention comprises an annular frame designated generally at A, said frame consisting of a plurality of annular sections 1, said sections bearing a spaced relation to each other. One series of bolts 2 passes transversely through the sections 1 of the frame A and serves to tie said sections together, said sections being properly spaced in relation to each other by means of washers 3 which are placed upon the bolts 2 between the sections 1 of the frame A. Another circular series of bolts 4 is inserted transversely through the sections 1 of the frame A adjacent to the inner surface of said frame as shown and journaled upon each bolt 4 is a pair of obliquely extending arms 5. At their outer ends the arms 5 are provided with attaching portions 6 extending in angular relation to the arms proper and riveted or otherwise secured to the inner face of one of a plurality of tread supporting sections 7, the tread supporting sections collectively forming a sectional annular outer rim designated generally at B. Between each tread supporting section 7 and the frame A there is interposed a plurality of cushioning springs 8 each section 7 being provided with spring holding studs 9 on its inner face and the frame A being also provided with corresponding spring holding studs 10 on its outer face, said studs serving to maintain the cushioning springs 8 in proper relation to the frame A and the tread supporting sections 7. The outer series of bolts 2, in connection with the spacing washers 3 thereon, serves as means for limiting the outward movement of the arms 5 so as to properly position the tread sections in relation to each other when no load is imposed thereon.

As shown in Fig. 3, each tread supporting section 7 is provided with opposite flanges 11 and an end flange 12 beneath which a tread block 13 is adapted to be inserted by sliding said block edgewise beneath said flanges 11 and 12. The tread block is provided with intersecting grooves 14 and 15 which leave projecting blocks 16 thereby providing for a good tractive hold of each tread block on the road surface to prevent lateral skidding and to enable the tire as a whole to obtain the necessary grip on the road. In order to more securely fasten the tread block in place, I provide a metal retainer 16' which conforms generally to the shape of the intersecting grooves 14 and 15 and an end space 17 left at the receiving end of the flanged tread supporting section 7. Bolts or rivets 18 are inserted through the retainer 16 and the tread block as well as the tread holding section 7. Ordinarily, the tread block is composed of rubber or some fabric having rubber embodied therein. When a tread block is worn out, the remnant thereof may be removed from its tread supporting section and a new tread block substituted therefor. If desired, the tire as a whole may be incased in a suitable flexible covering.

The tread supporting sections 7 are composed of metal of any suitable thickness which will resist puncture or injury and on account of the arrangement of supporting arms and cushioning springs, the tread sections are adapted to yield independently of each other as the load is successively imposed thereon in the rotation of the wheel. In case of the breakage of one or more of the cushioning springs 8, new springs may be readily substituted therefor. It will, of course, be understood also that the frame A may be of any desired width in accordance with the width of the tread required and that various changes may be made in the form, proportion and minor details of construction without departing from the principle or sacrificing any of the advantages of the invention.

What I claim, is:—

1. A tire comprising an annular frame divided longitudinally into a plurality of annular sections arranged in spaced relation to each other, spacing washers arranged between said sections, one series of bolts passing transversely through said sections and said washers and tying said sections together and holding said washers in place, another series of bolts also passing transversely through said sections, two circular series of arms journaled on the second series of bolts and extending obliquely outward beyond the frame, arcuate tread sections fastened to said arms and collectively forming an outer sectional tread supporting rim encircling said frame, and cushioning springs interposed between said tread sections and frame.

2. A tire comprising an annular frame divided longitudinally into a plurality of annular sections arranged in spaced relation to each other, spacing washers arranged between said sections, one series of bolts passing transversely through said sections and said washers and tying said sections together and holding said washers in place, another series of bolts also passing transversely through said sections, two circular series of arms journaled on the second series of bolts and extending obliquely outward beyond the frame, arcuate tread sections fastened to said arms and collectively forming an outer sectional tread supporting rim encircling said frame, and cushioning springs interposed between said tread sections and frame, the first series of bolts forming stops for said arms when the tread sections are at the outer limit of their movement.

In testimony whereof I affix my signature in presence of two witnesses.

JOSEPH M. CLARK.

Witnesses:
H. H. BOIE,
E. S. ALEXANDER.

Copies of this patent may be obtained for five cents each, by addressing the "Commissioner of Patents, Washington, D. C."